United States Patent
Clingerman et al.

(10) Patent No.: US 6,376,112 B1
(45) Date of Patent: Apr. 23, 2002

(54) CONTROLLED SHUTDOWN OF A FUEL CELL

(75) Inventors: Bruce J. Clingerman, Palmyra; Donald H. Keskula, Webster, both of NY (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/502,876

(22) Filed: Feb. 11, 2000

(51) Int. Cl.[7] .......................... H01M 8/04; H01M 08/06
(52) U.S. Cl. .............................. 429/17; 429/19; 429/22
(58) Field of Search .............................. 429/13, 17, 19, 429/20, 22

(56) References Cited

U.S. PATENT DOCUMENTS

| | | | |
|---|---|---|---|
| 4,128,700 A | 12/1978 | Sederquist | 429/17 |
| 4,293,315 A | 10/1981 | Sederquist | 48/94 |
| 4,642,272 A | 2/1987 | Sederquist | 429/17 |
| 4,650,727 A | 3/1987 | Vanderborgh et al. | 429/19 |
| 4,659,634 A | 4/1987 | Struthers | 429/19 |
| 4,670,359 A | 6/1987 | Beshty et al. | 429/17 |
| 4,678,723 A | 7/1987 | Wertheim | 429/17 |
| 4,816,353 A | 3/1989 | Wertheim et al. | 429/19 |
| 4,820,594 A * | 4/1989 | Sugita et al. | 429/17 |
| 4,923,768 A | 5/1990 | Kaneko et al. | 429/19 |
| 4,994,331 A | 2/1991 | Cohen | 429/17 |
| 5,248,567 A | 9/1993 | Amemiya et al. | 429/20 |
| 5,271,916 A | 12/1993 | Vanderborgh et al. | 429/12 X |
| 5,272,017 A | 12/1993 | Swathirajan et al. | 429/33 |
| 5,316,871 A | 5/1994 | Swathirajan et al. | 429/33 |
| 5,484,577 A | 1/1996 | Buswell et al. | 422/211 |
| 5,518,705 A | 5/1996 | Buswell et al. | 429/13 X |
| 5,554,453 A | 9/1996 | Steinfeld et al. | 429/17 |
| 5,605,770 A | 2/1997 | Andreoli et al. | 429/20 |
| 5,637,415 A | 6/1997 | Meltser | 429/17 |
| 5,702,838 A | 12/1997 | Yasumoto et al. | 429/40 |
| 5,763,113 A | 6/1998 | Meltser et al. | 429/13 |
| 6,077,620 A * | 6/2000 | Pettit | 429/20 X |
| 6,159,626 A * | 12/2000 | Keskula et al. | 429/22 |
| 6,232,005 B1 * | 5/2001 | Pettit | 429/19 |

FOREIGN PATENT DOCUMENTS

| | | | |
|---|---|---|---|
| JP | 2-260369 | * | 10/1990 |
| JP | 5-217595 | * | 8/1993 |
| WO | WO 09/08771 | | 3/1998 |

OTHER PUBLICATIONS

Szaniszlo, "The Advanced Low–Emissions Catalytic–Combustor Program :Phase 1—Description and Status," ASME #79–GT–192, (Mar. 1979).
Krill et al., "Catalytic Combustion for System Applications," ASME #79–HT–54, (Dec. 1979).
Hall et al., "A Porous Media Burner for Reforming Methanol for Fuel Cell Powered Electric Vehicles," SAE Paper #950095, (Mar. 1995).
Natural Gas Power Plant System (a descriptive drawing) (Date and Author, unknown).

* cited by examiner

Primary Examiner—Stephen Kalafut
(74) Attorney, Agent, or Firm—Karl F. Barr, Jr.; Linda M. Deschere

(57) ABSTRACT

A method is provided for the shutdown of a fuel cell system to relieve system overpressure while maintaining air compressor operation, and corresponding vent valving and control arrangement. The method and venting arrangement are employed in a fuel cell system, for instance a vehicle propulsion system, comprising, in fluid communication, an air compressor having an outlet for providing air to the system, a combustor operative to provide combustor exhaust to the fuel processor.

12 Claims, 2 Drawing Sheets

CONTROLLED SHUTDOWN OF A FUEL CELL

GOVERNMENT SUPPORT

The Government of the United States of America has certain rights in this invention pursuant to Agreement No. DE-AC02-90CH10435 awarded by the U.S. Department of Energy.

FIELD OF THE INVENTION

This invention relates to a fuel cell system and more particularly to a system having a plurality of cells which consume an $H_2$-rich gas to produce power.

BACKGROUND OF THE INVENTION

Fuel cells have been used as a power source in many applications. For example, fuel cells have been proposed for use in electrical vehicular power plants to replace internal combustion engines. In proton exchange membrane (PEM) type fuel cells, hydrogen is supplied to the anode of the fuel cell and oxygen is supplied as the oxidant to the cathode. PEM fuel cells include a membrane electrode assembly (MEA) comprising a thin, proton transmissive, non-electrically conductive solid polymer electrolyte membrane having the anode catalyst on one of its faces and the cathode catalyst on the opposite face. The MEA is sandwiched between a pair of electrically conductive elements which (1) serve as current collectors for the anode and cathode, and (2) contain appropriate channels and/or openings therein for distributing the fuel cell's gaseous reactants over the surfaces of the respective anode and cathode catalysts. The term fuel cell is typically used to refer to either a single cell or a plurality of cells (stack) depending on the context. A plurality of individual cells are commonly bundled together to form a fuel cell stack and are commonly arranged in series. Each cell within the stack comprises the membrane electrode assembly (MEA) described earlier, and each such MEA provides its increment of voltage. A group of adjacent cells within the stack is referred to as a cluster. Typical arrangements of multiple cells in a stack are described in U.S. Pat. No. 5,763,113, assigned to General Motors Corporation.

In PEM fuel cells, hydrogen ($H_2$) is the anode reactant (i.e., fuel) and oxygen is the cathode reactant (i.e., oxidant). The oxygen can be either a pure form ($O_2$), or air (a mixture of $O_2$ and $N_2$), though in this specification the term "air" is used to refer to both $O_2$ and $O_2$ in combination with other gases. The solid polymer electrolytes are typically made from ion exchange resins such as perfluoronated sulfonic acid. The anode/cathode typically comprises finely divided catalytic particles, which are often supported on carbon particles, and mixed with a proton conductive resin. The catalytic particles are typically costly precious metal particles. These membrane electrode assemblies are relatively expensive to manufacture and require certain conditions, including proper water management and humidification, and control of catalyst fouling constituents such as carbon monoxide (CO), for effective operation.

For vehicular applications, it is desirable to use a liquid fuel such as an alcohol (e.g., methanol or ethanol), or hydrocarbons (e.g., gasoline) as the source of hydrogen for the fuel cell. Such liquid fuels for the vehicle are easy to store onboard and there is a nationwide infrastructure for supplying liquid fuels. However, such fuels must be dissociated to release the hydrogen content thereof for fueling the fuel cell. The dissociation reaction is accomplished within a chemical fuel processor or reformer. The fuel processor contains one or more reactors wherein the fuel reacts with steam and sometimes air, to yield a reformate gas comprising primarily hydrogen and carbon dioxide. For example, in the steam methanol reformation process, methanol and water (as steam) are ideally reacted to generate hydrogen and carbon dioxide. In reality, carbon monoxide and water are also produced. In a gasoline reformation process, steam, air and gasoline are reacted in a fuel processor which contains two sections. One is primarily a partial oxidation reactor (POX) and the other is primarily a steam reformer (SR). The fuel processor produces hydrogen, carbon dioxide, carbon monoxide and water. Downstream reactors may include a water/gas shift (WGS) and preferential oxidizer (PROX) reactors. In the PROX, carbon dioxide ($CO_2$) is produced from carbon monoxide (CO) using oxygen from air as an oxidant. Here, control of air feed is important to selectively oxidize CO to $CO_2$.

Fuel cell systems which process a hydrocarbon fuel to produce a hydrogen-rich reformate for consumption by PEM fuel cells are known and are described in co-pending U.S. patent application Ser. Nos. 08/975,422 and 08/980,087, filed in November, 1997, and U.S. Ser. No. 09/187,125, filed in November, 1998, and each assigned to General Motors Corporation, assignee of the present invention; and in International Application Publication Number WO 98/08771, published Mar. 5, 1998. A typical PEM fuel cell and its membrane electrode assembly (MEA) are described in U.S. Pat. Nos. 5,272,017 and 5,316,871, issued respectively Dec. 21, 1993 and May 31, 1994, and assigned to General Motors Corporation.

Efficient operation of a fuel cell system depends on the ability to effectively control system shutdown, particularly in a rapid shutdown mode. One particularly important system component in this regard is the air compressor, which delivers air/$O_2$ to the fuel cell system. Typically, the compressor operates at approximately 200° C. outlet temperature. This typical outlet temperature is very close to that which would degrade the compressor, that is, a temperature of approximately 210° C. A compressor overtemperature/overpressure condition can degrade the compressor, as well as sensitive downstream system components. However, while turning off the air compressor can alleviate the undesirable effects of an overtemperature/overpressure condition, the lack of air to the system can degrade other system components, including the fuel-cell, combustor, and reformer/fuel processor, all of which rely on airflow during shutdown. For instance, air flow to the combustor must be maintained during shutdown to prevent overheating as the combustor burns off residual gases. Accordingly, it is desirable to provide a method and apparatus by which a compressor overtemperature/overpressure condition can be alleviated during rapid shutdown without depriving other system components of necessary airflow.

SUMMARY OF THE INVENTION

In one aspect, the invention provides a venting methodology and system for relieving fuel cell system overpressure, particularly during rapid system shutdown, while maintaining airflow through the system. In a further aspect, there is provided a preferred valving and control arrangement for carrying out the inventive methodology.

In one arrangement there is provided a fuel cell system comprising, in fluid communication, an air compressor having an outlet for providing air to the system, a combustor operative to provide combustor exhaust to the fuel processor, and at least one valve for selectively venting combustor exhaust from the system when the fuel processor is reforming. The invention further provides selectively venting combustor exhaust via the at least one valve when the fuel processor is not reforming and when the air compressor is operating outside of one or more predetermined parameters.

According to one feature of this methodology, the operating condition of the fuel processor (i.e., whether it is operating to produce a reformate, such as $H_2$ gas) is determined, the condition of at least one operating parameter of the air compressor is determined, and combustor exhaust is selectively vented via the at least one valve if the fuel processor is not reforming and the at least one operating parameter of the air compressor is determined to exceed one or more predetermined values.

According to another feature of the invention, the step of determining the condition of at least one operating parameter of the air compressor comprises determining temperature and/or pressure conditions proximate the compressor outlet. According to this feature, combustor exhaust is selectively vented if the air compressor is operating above predetermined temperature and/or pressure values.

According to another inventive feature, the step of selectively venting combustor exhaust further comprises opening the at least one valve for a predetermined period of time. This predetermined period of time is, according to one feature of the invention, approximately one minute.

The invention methodology is carried out by at least one vent valve provided in the system flow path, for instance between the combustor and reformer, to vent combustor exhaust in response to a condition of fuel processor overheating. The control logic as adapted to this system determines one or more parameters reflecting the operating conditions of the reformer and the air compressor, and directs the at least one vent valve to open, even in the event that the reformer is not reforming, when the air compressor is determined to be operating outside of one or more predetermined parameters, such as an overtemperature/ overpressure condition, all according to the inventive methodology. Control of the vent valving can be through a dedicated controller comprising any suitable microprocessor, microcontroller, computer, etc. which has a central processing unit capable of executing a control program and data stored in memory, or other suitable means.

BRIEF DESCRIPTION OF THE DRAWINGS

The various features, advantages and other uses of the present invention will become more apparent by referring to the following description and drawings in which.

DETAILED DESCRIPTION OF THE PREFERRED EMBODIMENTS

The present invention methodology and apparatus for venting a fuel cell system during controlled shutdown provides selective venting of combustor exhaust gases in response to a condition of the system where the shutdown was necessitated by an overtemperature/overpressure air compressor when the reformer/fuel processor is not operating to produce reformate.

The present invention is particularly useful for fuel cell systems used to produce power for vehicle propulsion. This may be further understood with reference to the fuel cell system shown in FIG. 1 by way of example only. Therefore, before further describing the invention, it is useful to understand the type of system within which the shutdown venting methodology can be employed, and further to illustrate the location and interplay of vent valving in such a system.

Figure 1:
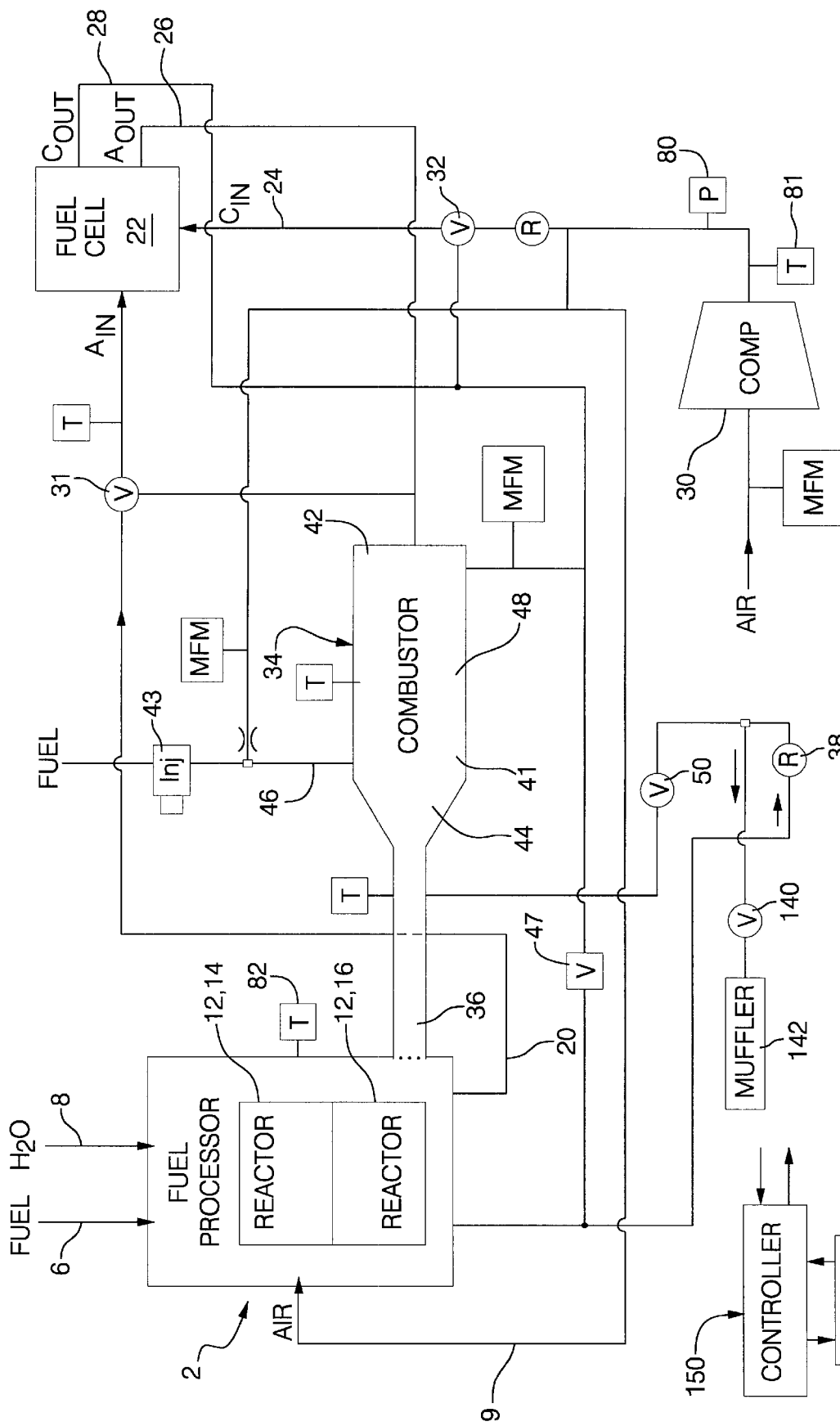
FIG. 1 is a drawing depicting a fuel cell system incorporating the controlled shutdown methodology and apparatus of the present invention.

FIG. 1 illustrates an example of a fuel cell system. The system may be used in a vehicle (not shown) as an energy source for vehicle propulsion. In the system, a hydrocarbon is processed in a fuel processor, for example, by reformation and preferential oxidation processes, to produce a reformate gas which has a relatively high hydrogen content on a volume or molar basis. Therefore, reference is made to hydrogen-rich or relatively high hydrogen content.

The invention is hereafter described in the context of a fuel cell fueled by an $H_2$-rich reformate regardless of the method by which such reformate is made. It is to be understood that the principles embodied herein are applicable to fuel cells fueled by $H_2$ obtained from any source, including reformable hydrocarbon and hydrogen-containing fuels such as methanol, ethanol, gasoline, alkene, or other aliphatic or aromatic hydrocarbons.

As shown in FIG. 1, a fuel cell apparatus includes a fuel processor 2 for catalytically reacting a reformable hydrocarbon fuel stream 6, and water in the form of steam from a water stream 8. In some fuel processors, air is also used in a combination preferential oxidation/steam reforming reaction. In this case, fuel processor 2 also receives an air stream 9. The fuel processor contains one or more reactors 12 wherein the reformable hydrocarbon fuel in stream 6 undergoes dissociation in the presence of water/steam 8 and sometimes air (in stream 9) to produce the hydrogen-rich reformate. Further, each reactor 12 may comprise one or more reactor beds. Reactor 12 may have one or more sections or beds, and a variety of designs are known and usable. Therefore, the selection and arrangement of reactors 12 may vary; and exemplary fuel reformation reactor(s) 14 and downstream reactor(s) 16 are described immediately below.

By way of example, in an exemplary steam/methanol reformation process, methanol and water (as steam) are ideally reacted in a reactor 14 to generate hydrogen and carbon dioxide as described earlier in the background. In reality, carbon monoxide and water are also produced. By way of further example, in an exemplary gasoline reformation process, steam, air and gasoline are reacted in a fuel processor which comprises a reactor 14 which has two sections. One section of the reactor 14 is primarily a partial oxidation reactor (POX) and the other section of the reactor is primarily a steam reformer (SR). As in the case of methanol reformation, gasoline reformation produces the desired hydrogen but, in addition, produces carbon dioxide, water and carbon monoxide. Therefore, after each type of reformation, it is desirable to reduce the carbon monoxide content of the product stream.

Accordingly, the fuel processor typically also includes one or more downstream reactors 16, such as water/gas shift (WGS) and preferential oxidizer (PROX) reactors which are used to produced carbon dioxide from carbon monoxide, as described earlier in the background. Preferably, the initial reformate output gas stream which comprises hydrogen, carbon dioxide, carbon monoxide and water is further treated in a preferential oxidation (PROX) reactor 16 to reduce the CO-levels therein to acceptable levels, for example, below 20 ppm. Then, during running mode, the $H_2$ rich reformate 20 is fed through valve 31 into the anode chamber of a fuel cell stack 22. At the same time, oxygen (e.g., air) from an oxidant stream 24 is fed into the cathode chamber of the fuel cell 22. The hydrogen from the reformate stream 20 and the oxygen from the oxidant stream 24 react in the fuel cell 22 to produce electricity.

Exhaust or effluent 26 from the anode side of the fuel cell 22 contains some unreacted hydrogen. The exhaust or effluent 28 from the cathode side of the fuel cell 22 contains some unreacted oxygen. Air for the oxidant stream 24 is provided by an air supply, preferably compressor 30. Air from the air supply (compressor 30) is directed to the fuel cell 22 by a valve 32 under normal operating conditions. During start-up, however, the valve 32 is actuated to provide air directly to the input of a combustor 34. The air is used in combustor 34 to react with a fuel supplied through line 46. The heat of combustion is used to heat various parts of the fuel processor 2.

It should be noted that some of the reactions which occur in fuel processor 2 are endothermic and so require heat; other reactions are exothermic and require removal of heat. Typically, the PROX reactor 16 requires removal of heat. One or more of the reformation reactions in reactor 14 are typically endothermic and require heat be added. This is typically accomplished by preheating reactants, fuel 6, steam 8, and air 9 and/or by heating selected reactors.

Heat from the combustor 34 heats selected reactors and reactor beds in the fuel processor 2 during start-up. The combustor 34 achieves heating of the selected reactors and beds in the fuel processor, as necessary, by indirect heat transfer thereto. Typically, such indirectly heated reactors comprise a reaction chamber with an inlet and an outlet. Within the reaction chamber, the beds are in the form of carrier member substrates each having a first surface carrying catalytically active material for accomplishing the desired chemical reactions. A second surface opposite the first surface is for heat transfer from hot gases to the carrier member substrates. In addition, the combustor 34 is usable to preheat the fuel 6, water 8 and air 9 being supplied as reactants to the fuel processor 2.

It should be noted that the air 9 supplied to the fuel processor 2 may be used in one or more of the reactors 12. If reactor 14 is a gasoline reformation reactor, then air from line 9 is supplied to reactor 14. The PROX reactor 16 also utilizes air to oxidize CO to $CO_2$ and also receives air from air supply source (compressor 30) via line 9.

The combustor 34 defines a chamber 41 with an inlet end 42, an exhaust end 44, and a catalyst section 48 between the ends. Hydrocarbon fuel is injected into the combustor. The hydrocarbon fuel, if in liquid form, is preferably vaporized either before being injected into the combustor or in a section of the combustor to disperse the fuel for combustion. Vaporization may be done by an electric heater. Once the system is operating and the combustor has heated up, vaporization may occur by heat exchange using heat from the combustor exhaust to vaporize incoming fuel. Preferably, a fuel metering device 43 is provided to control the rate at which hydrocarbon fuel is provided to the combustor.

The hydrocarbon fuel 46 and the anode effluent 26 are reacted in the catalyst section 48 of the combustor 34, which section is between the inlet and exhaust ends 42 and 44, respectively, of the combustor 34. Oxygen is provided to the combustor 34 either from the air supply (i.e., compressor 30) via valve 32 or from a second air flow stream, such as a cathode effluent stream 28, depending on system operating conditions. A valve 50 permits releasing of the combustor exhaust 36 to the atmosphere when it is not needed to heat reactors in the fuel processor 2.

As can be seen, the hydrocarbon fuel stream 46 supplements the anode effluent 26 as fuel for the combustor 34, as may be needed, to meet the transient and steady state needs of the fuel cell apparatus. In some situations, exhaust gas passes through a regulator 38, a shutoff valve 140, and a muffler 142 before being released to the atmosphere. In FIG. 1, the symbols are as follows: V is valve, MFM is mass flow meter, T is temperature monitor, P is pressure monitor, R is regulator, C is cathode side, A is anode side of fuel cell, INJ is injector, COMP is compressor.

The amount of heat demanded by the selected reactors within the fuel processor 2, which is to be supplied by the combustor 34, is dependent upon the amount of fuel and water input and ultimately the desired reaction temperature in the fuel processor 2. As stated earlier, sometimes air is also used in the fuel processor reactor and must also be considered along with the fuel and water input. To supply the heat demand of the fuel processor 2, the combustor 34 utilizes all anode exhaust or effluent and potentially some hydrocarbon fuel. Enthalpy equations are used to determine the amount of cathode exhaust air to be supplied to the combustor 34 to meet the desired temperature requirements of the combustor 34 and ultimately satisfies the heat demanded by the fuel processor 2. The oxygen or air provided to the combustor 34 includes one or both of cathode effluent exhaust 28, which is typically a percentage of the total oxygen supplied to the cathode of the fuel cell 22, and a compressor output air stream depending on whether the apparatus is operating in a start-up mode wherein the compressor air stream is exclusively employed, or in a run mode using the cathode effluent 28 and/or compressor air. In the run mode, any total air, oxygen or diluent demand required by the combustor 34, which is not met by the cathode effluent 28, is supplied by the compressor 30 in an amount to satisfy the temperature and heat demanded by the combustor 34 and the fuel processor 2, respectively. The air control is implemented via an air dilution valve 47 which preferably is a stepper motor driven valve having a variable orifice to control the amount of bleed-off of cathode exhaust 28 supplied to the combustor 34.

In this exemplary representation of a fuel cell apparatus, operation is as follows. At the beginning of operations when the fuel cell apparatus is cold and starting up: (1) the compressor 30 is driven by an electric motor energized from an external source (e.g., a battery) to provide the necessary system air; (2) air is introduced into the combustor 34; hydrocarbon fuel 46 (e.g., MeOH or gasoline) is injected into the combustor 34; (3) the air and fuel react in the combustor 34, where substantially complete combustion of the fuel is effected; and (4) the hot exhaust gases exiting the combustor 34 are conveyed to the selected reactors 12 associated with the fuel processor 2.

Once the reactors in the fuel processor 2 have attained adequate temperature, the reformation process begins and the process includes the following: (1) valve 32 is activated to direct air to the cathode side of the fuel cell 22; (2) fuel and water are fed to the fuel processor 2 to commence the reformation reaction; (3) reformate exiting the fuel processor 2 is fed to the anode side of the fuel cell 22; (4) anode effluent 26 from the fuel cell 22 is directed into the combustor 34; (5) cathode effluent 28 from the fuel cell 22 is directed into the combustor 34; (6) the fuel, air, cathode effluent 28 and anode effluent 26 are burned in the combustor 34. In a preferred sequence, step (2) is implemented first along with the supplying of air directly to the combustor. Then, when the hydrogen-rich stream has adequately low CO level, steps (1) and (3) are implemented, followed by steps (4), (5) and (6).

Under certain conditions, the combustor 34 could operate solely on the anode and cathode effluents, without the need for additional hydrocarbon fuel 46. Under such conditions, fuel injection to the combustor 34 is discontinued. Under other conditions, e.g., increasing power demands, supplemental fuel 46 is provided to supplement the Aout 26 to the combustor 34. It can be seen that the combustor 34 receives multiple fuels, such as a hydrocarbon fuel as well as anode effluent 26 from the anode of the fuel cell 22. Oxygen depleted exhaust air 28 from the cathode of the fuel cell 22 and air from the compressor 30 are also supplied to the combustor 34.

According to the present fuel cell system example, a controller 150 shown in FIG. 1 controls various aspects of the operation of the system shown in FIG. 1. The controller 150 may comprise any suitable microprocessor, microcontroller, personal computer, etc., which has central processing unit capable of executing a control program and data stored in a memory. The controller 150 may be a dedicated controller specific to any of the components in FIG. 1, or implemented in software stored in the main vehicle electronic control module. Further, although software based control programs are usable for controlling system components in various modes of operation as described above, it will also be understood that the control can also be implemented in part or whole by dedicated electronic circuitry.

Figure 2:
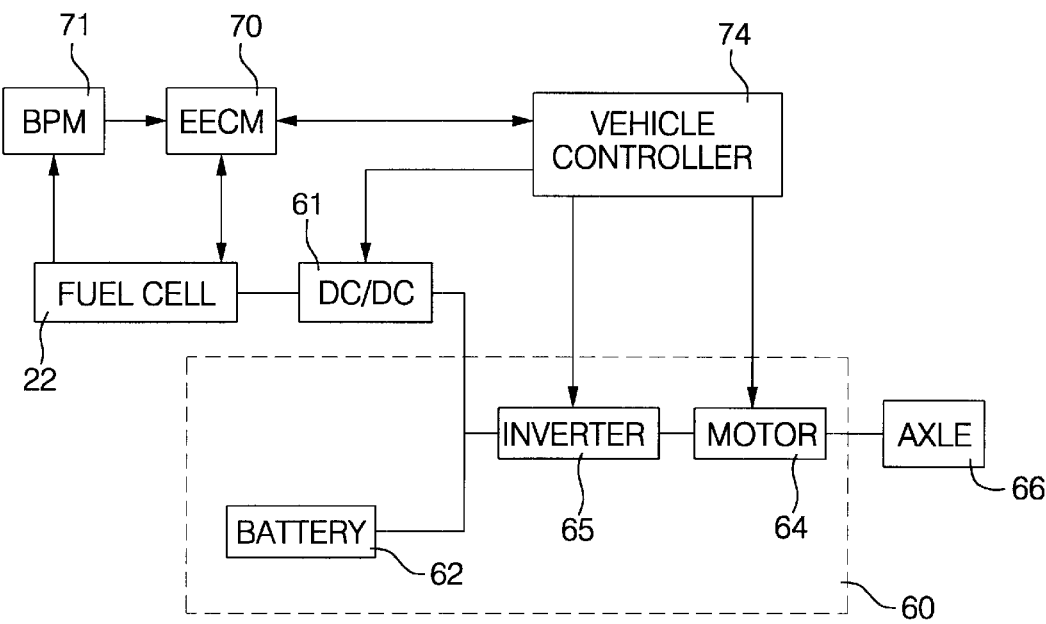
FIG. 2 is a drawing of the fuel cell apparatus shown in FIG. 1 connected in a pictorial representation of a use application.

In a preferred embodiment, the fuel cell system comprises the fuel cell 22 as part of a vehicle propulsion system 60 (see FIG. 2). Here, a portion of the system 60, comprises a battery 62, an electric motor 64, and associated drive electronics including inverter 65 constructed and arranged to accept electric energy from a DC/DC converter 61 associated with the fuel cell system, and particularly fuel cell 22, and to convert it to mechanical energy produced by motor 64. The battery 62 is constructed and arranged to accept and store electrical energy supplied by fuel cell 22 and to accept and store electrical energy supplied by motor 64 during regenerative breaking, and to provide electric energy to motor 64. The motor 64 is coupled to driving axle 66 to rotate wheels of a vehicle (not shown). An electrochemical engine control module (EECM) 70 and a battery pack module (BPM) 71 monitor various operating parameters, including, but not limited to, the voltage and current of the stack. For example, this is done by the battery pack module (BPM) 71, or by the BPM 71 and the EECM 70 together, to send an output signal (message) to the vehicle controller 74 based on conditions monitored by the BPM 71. The vehicle controller 74 controls the electric motor 64, the drive electronics including inverter 65, the DC/DC converter 61, and requests a power level from the EECM 70.

The controller 150, which may be implemented by way of non-limiting example in the BPM 71 and/or EECM 70, monitors the operation of the fuel cell system with respect to pressures, temperatures, start-up times, cycles, etc., commands valve operation in response to system condition information and routinely generates shutdown commands in response to selected conditions of the system.

As indicated, the heatdump valve 50 serves to cool down the fuel processor 2 during normal system operation by shunting combustor exhaust 36 past regulator 38, as shown in FIG. 1. This bypass is regulated by the controller 150, which monitors the temperature of the fuel processor 2 via temperature monitor 82, and directs heatdump valve 50 to open in response to a fuel processor 2 overtemperature condition.

During rapid shutdown, the heatdump valve 50 is likewise directed to open in the event that the fuel processor 2 is operating outside desired operating temperature, for instance above approximately 260° C., to vent combustor exhaust to the atmosphere. After about one (1) minute, the fuel processor 2 has cooled sufficiently so that the heatdump valve 50 closes. In the event that a regulator valve 38 failed in the closed position to cause the rapid system shutdown, opening of the heatdump valve 50 by this methodology effectively relieves system overpressure, since the heatdump valve 50 bypasses regulator 38 as shown in FIG. 1.

However, during system startup, when the combustor 34 is not running on hydrogen, the fuel processor 2 has not attained reformation temperature and is not yet reforming. In the event of a shutdown, the heatdump valve 50 will not open in response to fuel processor overtemperature since the fuel processor 2 has not reached operating temperature. In order to alleviate a system overpressure condition, for instance caused by regulator 38 failure on startup, without depriving downstream components of needed air during rapid shutdown, the present invention methodology directs the heatdump valve 50 to bypass regulator 38 in the event the air compressor 30 is determined to be operating outside one or more predetermined parameters, such as an overtemperature condition.

Figure 3:
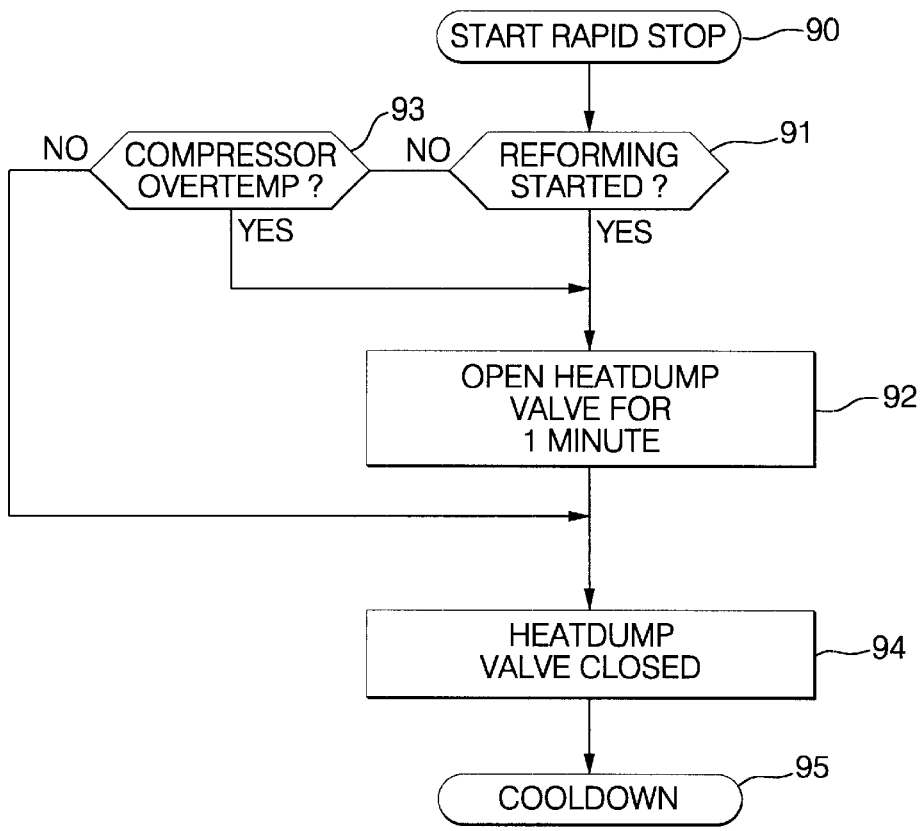
FIG. 3 is a flow diagram representation of the venting methodology of the present invention.

The inventive methodology is shown in flow diagram in FIG. 3. During the commencement of a rapid shutdown procedure (90), the logic in FIG. 3 determines system condition information to determine if the fuel processor has started (e.g., reached reforming temperature) (91). If it has, then the heatdump valve will open (92) as necessary in response to a fuel processor overtemperature condition. This venting response effectively relieves system overpressure irrespective of the cause. If the fuel processor is determined to be in a start-up condition, such that the heatdump valve will not be opened by a fuel processor overtemperature condition, the logic next determines one or more air compressor operating parameters at the compressor outlet (93). If the air compressor is operating within desired parameters, for instance below a predetermined maximum output temperature, then the heatdump valve remains closed (94) and cool down (95) occurs due to a quick shut-off of the combustor fuel or other shut-down procedure may be effected by the controller; prior to operation of the reformer, the combustor cools very rapidly if the combustor fuel is shut-off. If the compressor is operating outside of the one or more desired operating parameters, the algorithm logic directs the heatdump valve to open (92) so that combustor exhaust is vented from the system, bypassing the regulator, and relieving system overpressure/overtemperature.

During venting in response to compressor outlet conditions, the heatdump valve is preferably maintained in the open position for at least the minimum period necessary for system parameters to return to acceptable levels. In the system of the illustrated example, this period is approximately 1 minute. This duration may be predetermined and programmed into the controller, or may be subject to feedback control from sensor means provided proximate the compressor outlet or elsewhere in the fuel cell system.

The venting control according to the present invention may be implemented in either hardware or software, and with appropriate monitoring means. Preferably, the control is implemented in software as part of the control program of the controller 150, which controller generates appropriate command signals directing the operation of heatdump valve 50 in the manner described with reference to FIG. 3. Preferably, compressor parameter information consists of temperature information, and most preferably temperature and pressure information, provided to the algorithm logic. In the illustrated embodiment, both pressure 80 and temperature 81 sensors are preferably provided at or near the compressor outlet, these sensors being operatively associated with the controller 150. The controller 150 may be programmed with values representing desired operating parameters of the air compressor for comparison with sensed values, thereby facilitating the inventive methodology. Information respecting the operating condition of the fuel processor 2 may, by way of example, be provided to the logic via temperature sensor 82, the controller 150 being programmed with a predetermined temperature value corresponding to the reforming temperature so as to reflect a fuel processor start-up condition.

As indicated, the controller 150 may be programmed to open heatdump valve 50 for a predetermined period of time in response to a shutdown event at system startup, according to the invention methodology. It is preferred that this value represent approximately 1 minute of venting, which duration is sufficient to relieve the overpressure condition in a fuel cell system as illustrated. Of course, the venting duration will vary according to the needs and design of the system in which this methodology is employed. Alternatively, the controller 150 may generate a heatdump valve 50 closure command signal in response to information from either or both of pressure 80 and temperature 81 sensors reflecting that system conditions are within desired operating parameters.

It will be appreciated that the foregoing methodology and vent valving and control arrangement dispenses with the need for adding additional components to a fuel cell system specifically for venting the air compressor, while providing for the shutdown venting of combustor exhaust, and thus relieving system overpressure while permitting continued compressor operation, even when the fuel processor is in a startup condition.

It will be understood from the foregoing examples of the invention methodology and apparatus that a particular method and valving arrangement is illustrated for one exemplary fuel cell system. The specific valving arrangement, location of valves, types of valves and vents used, the relative speeds of the valving and their closing function relative to one another may vary depending on the fuel cell apparatus to which the invention is applied. Such variations and modifications can be made by those skilled in the art without undue experimentation based on the disclosed invention in the embodiment above. Nothing in the foregoing description is intended to limit the invention beyond the scope of the following claims.

The invention in which an exclusive property or privilege is claimed is defined as follows:

1. A method for venting a fuel cell system comprising, in fluid communication, an air compressor having an outlet for providing air to the system, a fuel processor for reforming a fuel to produce a reformate, a combustor operative to provide combustor exhaust to the fuel processor, and at least one valve for selectively venting combustor exhaust from the system when the fuel processor is reforming, the method comprising the steps of:

further selectively venting combustor exhaust via the at least one valve when the fuel processor is not reforming and the air compressor is operating outside of at least one predetermined value of at least one parameter.

2. The method of claim 1, wherein the at least one parameter corresponds to at least one of a desired temperature condition and a desired pressure condition of air proximate the compressor outlet.

3. The method of claim 1, wherein the step of further selectively venting combustor exhaust further comprises opening the at least one valve for a predetermined period of time.

4. The method of claim 3, wherein the predetermined period of time is approximately one minute.

5. A rapid-shutdown venting method for a vehicle propulsion system powered by a fuel cell system comprising, in fluid communication, an air compressor having an outlet for providing air to the system, a fuel processor capable of reforming a fuel to produce a reformate, a combustor operative to provide combustor exhaust to the fuel processor, and at least one valve for selectively venting combustor exhaust from the system when the fuel processor is reforming, the method comprising the steps of:

determining if the fuel processor is reforming;

determining at least one of temperature and pressure of air proximate the air compressor outlet; and selectively venting combustor exhaust via the at least one valve when the fuel processor is not reforming and at least one of the temperature and pressure of the air compressor proximate the compressor outlet exceeds at least one predetermined temperature value and pressure value.

6. The method of claim 5, wherein the step of selectively venting combustor exhaust further comprises opening the at least one valve for a predetermined period of time.

7. The method of claim 6, wherein the predetermined period of time is approximately one minute.

8. A venting system for a fuel cell system comprising, in fluid communication, a compressor having an outlet for providing air to the system, a fuel processor capable of reforming a fuel to produce a reformate, a combustor operative to provide combustor exhaust to the fuel processor, and at least one valve for selectively venting combustor exhaust from the system when the fuel processor is reforming, the venting system comprising:

at least one sensor provided proximate the air compressor outlet for sensing at least one operating parameter of the air compressor;

a controller operative to monitor information from the at least one sensor corresponding to the at least one operating parameter of the air compressor and to determine if the sensor information exceeds a predetermined value; to determine if the fuel processor is reforming; and to direct the at least one valve to open if the fuel processor is not reforming and the air compressor operating parameter exceeds the predetermined value.

9. The system of claim 8, wherein the at least one sensor senses the temperature proximate the air compressor outlet.

10. The system of claim 9, further comprising providing at least a second sensor proximate the compressor outlet for sensing air pressure.

11. The system of claim 8, wherein the controller is operative to direct the at least one valve to open for a predetermined period of time.

12. The system of claim 11, wherein the predetermined period of time is approximately one minute.

\* \* \* \* \*